(12) United States Patent
Maeda

(10) Patent No.: US 8,280,929 B2
(45) Date of Patent: Oct. 2, 2012

(54) RECORDING APPARATUS

(75) Inventor: Masamine Maeda, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 366 days.

(21) Appl. No.: 11/215,273

(22) Filed: Aug. 30, 2005

(65) Prior Publication Data

US 2006/0045488 A1   Mar. 2, 2006

(30) Foreign Application Priority Data

Sep. 2, 2004   (JP) ................................. 2004-255771

(51) Int. Cl.
G06F 17/30   (2006.01)

(52) U.S. Cl. ..... 707/822; 386/210; 386/219; 348/231.2; 358/462

(58) Field of Classification Search .......................... None
See application file for complete search history.

(56) References Cited

U.S. PATENT DOCUMENTS

| | | | |
|---|---|---|---|
| 6,118,445 A | 9/2000 | Nonomura et al. | |
| 6,199,098 B1* | 3/2001 | Jones et al. | 709/203 |
| 7,146,388 B2* | 12/2006 | Stakutis et al. | 707/204 |
| 2001/0005846 A1* | 6/2001 | Barney et al. | 707/1 |
| 2002/0039203 A1* | 4/2002 | Endo et al. | 358/462 |
| 2003/0142960 A1* | 7/2003 | Yokota et al. | 386/94 |
| 2004/0010750 A1* | 1/2004 | Chung et al. | 715/501.1 |
| 2004/0107223 A1* | 6/2004 | Uno et al. | 707/200 |
| 2004/0172416 A1* | 9/2004 | Murakami et al. | 707/104.1 |
| 2005/0013208 A1* | 1/2005 | Hirabayashi et al. | 369/27.01 |
| 2006/0051062 A1* | 3/2006 | Kusaka et al. | 386/95 |
| 2006/0069689 A1* | 3/2006 | Karklins et al. | 707/100 |
| 2006/0288044 A1* | 12/2006 | Kashiwagi et al. | 707/200 |
| 2007/0033234 A1* | 2/2007 | Murakami et al. | 707/200 |
| 2008/0056074 A1* | 3/2008 | Hirabayashi et al. | 369/27.01 |
| 2009/0180005 A1* | 7/2009 | Takahashi | 348/231.2 |

FOREIGN PATENT DOCUMENTS

| | | |
|---|---|---|
| JP | 10-199215 | 7/1998 |
| JP | 2000-41209 | 2/2000 |
| JP | 2000-298976 | 10/2000 |
| JP | 2004-171053 | 6/2004 |

OTHER PUBLICATIONS

"Double-Layer Medium is OK! Satisfactory Storage Solution for Beginners to Advanced Users/ Easy and Fail-safe DVD Copy Technique", PC fan, Japan, Mainichi Communications Inc., Dec. 15, 2003, vol. 10, No. 26, pp. 46-47.

"VAIO Complete Use Technique for Summer Vacation", VAIO Style, Japan, Sony Magazines Inc., Aug. 25, 2002, vol. 12, No. 29, pp. 30-33, Aug. 25, 2002.

* cited by examiner

Primary Examiner — Thu Nga Nguyen
(74) Attorney, Agent, or Firm — Canon USA Inc. IP Division

(57) ABSTRACT

A recording apparatus includes a recording unit configured to record a plurality of content files on a recording medium, each containing an image signal, a first management file creating unit configured to, in association with a recording operation by the recording unit, create a first management file managing the plurality of content files using a plurality of hierarchical layers, and a second management file creating unit configured to, based on the first management file, create a second management file managing the plurality of content files recorded on the recording medium using one hierarchical layer.

3 Claims, 10 Drawing Sheets

```
     ⎧ <item1>
     │ attribute=MovieTakeFile
     │ name="WEDDING CEREMONY"
     │ parent=item1
501 ⎨ reference="mov_0001. mpg", "mov_0002. mpg"
     │ duration=1:17:58
     │ chapter0=0:00:00
     │ chapter_name0="CELEBRATION OF WEDDING CEREMONY"
     │ chapter1=0:15:39
     ⎩ chapter_name0="WEDDING RECEPTION"

⎧ <item2>
     │ attribute=MovieTakeFile
     │ name="ANOTHER FEAST"
     │ parent=item1
502 ⎨ reference="mov_0003. mpg", "mov_0004. mpg"
     │ duration=1:01:15
     │ chapter0=0:00:00
     │ chapter_name0="ENTRANCE"
     │ chapter1=0:10:47
     ⎩ chapter_name0="ENTERTAINMENT"
```

FIG.3

301 {
<item1>
attribute=folder
name="WEDDING CEREMONY"
sub_item=3
parent=root
}

302 {
<item2>
attribute=MovieTakeFile
name="CELEBRATION OF WEDDING CEREMONY"
parent=item1
reference="mov_0001. mpg"
duration=0:15:39
}

303 {
<item3>
attribute=MovieTakeFile
name="WEDDING RECEPTION"
parent=item1
reference="mov_0002. mpg"
duration=1:02:19
}

304 {
<item4>
attribute=folder
name="ANOTHER FEAST"
sub_item=2
parent=item1
}

305 {
<item5>
attribute=MovieTakeFile
name="ENTRANCE"
parent=item4
reference="mov_0003. mpg"
duration=0:10:47
}

306 {
<item6>
attribute=MovieTakeFile
name="ENTERTAINMENT"
parent=item4
reference="mov_0004. mpg"
duration=0:50:28
}

FIG.4

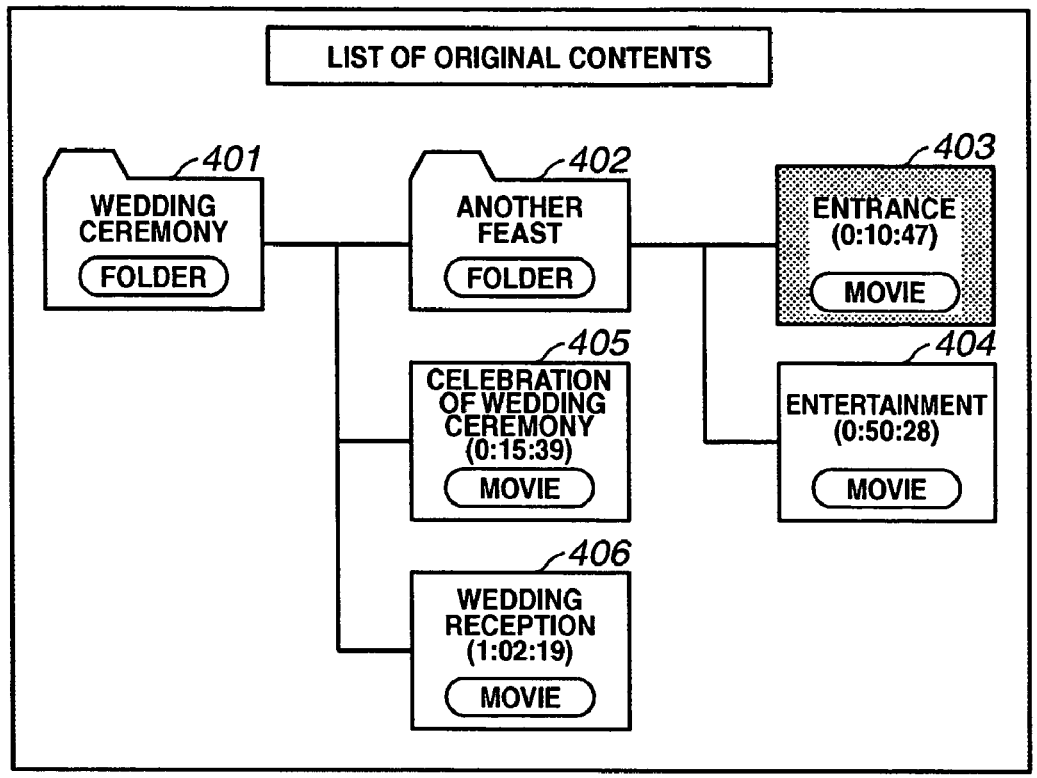

LIST OF ORIGINAL CONTENTS

- 401 WEDDING CEREMONY FOLDER
- 402 ANOTHER FEAST FOLDER
- 403 ENTRANCE (0:10:47) MOVIE
- 404 ENTERTAINMENT (0:50:28) MOVIE
- 405 CELEBRATION OF WEDDING CEREMONY (0:15:39) MOVIE
- 406 WEDDING RECEPTION (1:02:19) MOVIE

FIG.5

501
```
<item1>
attribute=MovieTakeFile
name="WEDDING CEREMONY"
parent=item1
reference="mov_0001. mpg", "mov_0002. mpg"
duration=1:17:58
chapter0=0:00:00
chapter_name0="CELEBRATION OF WEDDING CEREMONY"
chapter1=0:15:39
chapter_name0="WEDDING RECEPTION"
```

502
```
<item2>
attribute=MovieTakeFile
name="ANOTHER FEAST"
parent=item1
reference="mov_0003. mpg", "mov_0004. mpg"
duration=1:01:15
chapter0=0:00:00
chapter_name0="ENTRANCE"
chapter1=0:10:47
chapter_name0="ENTERTAINMENT"
```

FIG.10

1001
```
<item1>
attribute=folder
name="HOKKAIDO"
sub_item=3
parent=root
```

1002
```
<item2>
attribute=MovieTakeFile
name="FERRY"
parent=item1
reference="mov_0001. mpg"
date=2003/07/21
duration=0:30:09
```

1003
```
<item3>
attribute=MovieTakeFile
name="ACCOMMODATION"
parent=item4
reference="mov_0002. mpg"
date=2003/07/22
duration=0:39:45
```

1004
```
<item4>
attribute=folder
name="RISHIRI REBUN"
sub_item=2
parent=item1
```

1005
```
<item5>
attribute=MovieTakeFile
name="HOT-SPRING"
parent=item4
reference="mov_0003. mpg"
date=2003/07/24
duration=0:12:29
```

1006
```
<item5>
attribute=MovieTakeFile
name="SOYA MAIN LINE"
parent=item1
reference="mov_0004. mpg"
date=2003/07/25
duration=0:20:34
```

```
<item1>
attribute=MovieTakeFile
name="HOKKAIDO"
duration=1:42:57
chapter0=0:00:00
reference1="mov_0001. mpg"
date=2003/07/21
chapter1=0:30:09
reference2="mov_0002. mpg"
date=2003/07/22
chapter2=1:09:54
reference3="mov_0003. mpg"
date=2003/07/24
chapter3=1:22:23
reference4="mov_0004. mpg"
date=2003/07/25
```
1201

RECORDING APPARATUS

BACKGROUND OF THE INVENTION

1. Field of the Invention

The present invention relates to a recording apparatus, and more particularly to the management of a content file recorded on a recording medium.

2. Description of the Related Art

In recent years, an image recording apparatus using a large-capacity optical disk or flash memory card as an image recording medium has been proposed. A feature of this kind of recording medium is that, during reproduction (playback), random access is possible, similar to a file being accessed in a personal computer (PC), so that any photographed content can swiftly be called up. In many cases, during reproduction, since a reduced image (thumbnail) or a title list indicating photographed content is displayed in a list format, a user seeks out and designates a desirable image from within the display of a list, and performs reproduction thereof (for example, refer to Japanese Patent Application Laid-Open No. 2000-41209).

Further, recently, a video camera using such a kind of optical disk and memory card as a recording medium has come on the market. In the video camera, since recording time of a scene to be photographed at one time is on the order of several seconds to several minutes, several tens to several hundreds of image data can be recorded on one recording medium. If a great number of images are recorded in the above manner, it is difficult for the user to seek out an image that the user desires to reproduce.

Hence, it is considered that, as in file management performed by a personal computer (PC), photographed image data are classified and stored using a folder configuration having a plurality of hierarchical layers.

For instance, as shown in FIG. 11, image data photographed at a travel destination are stored in a folder "Hokkaido," and are further classified into a folder "Rishiri Rebun" in a hierarchical layer lower in level than in that of the folder "Hokkaido." Thus, a desirable image can easily be searched for.

However, in a recording medium which is not compatible with hierarchical folders, such as a DVD-R (digital versatile disc-recordable) or the like, image data cannot be managed in a format with a plurality of hierarchical layers.

Therefore, if content data managed with a folder configuration having a plurality of hierarchical layers are intended to be copied or moved to another recording medium which cannot be managed with any hierarchical structure, an editing operation on the image is required in some cases. The editing operation is performed such that once content data are taken into a PC, an editing device or the like, the content data is extracted from a folder, or the content data is combined and organized as one content data.

To perform such an operation, the time required to take the content data into the PC or the like is necessary, and the operation is extremely burdensome. In addition, when the user performs a similar editing operation afterwards, the user may not recall an editing process previously performed. Thus, there is also a possibility of causing a different editing result.

SUMMARY OF THE INVENTION

The present invention is directed to a recording apparatus and a recording method.

The present invention is directed to the recording apparatus which changes content data, which is hierarchically managed, into a form recordable on a recording medium in which recording data cannot hierarchically be managed.

In one aspect of the present invention, a recording apparatus includes a recording unit configured to record a plurality of content files on a recording medium, each containing an image signal, a first management file creating unit configured to, in association with a recording operation by the recording unit, create a first management file managing the plurality of content files using a plurality of hierarchical layers, and a second management file creating unit configured to, based on the first management file, create a second management file managing the plurality of content files recorded on the recording medium using one of the hierarchical layers.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a diagram showing an example of a first content management file according to the first embodiment of the present invention.

FIG. 4 is a diagram showing an example of a list of original contents according to the first embodiment of the present invention.

FIG. 5 is a diagram showing an example of a second content management file according to the first embodiment of the present invention.

FIG. 10 is a diagram showing an example of a third content management file according to the second embodiment of the present invention.

DETAILED DESCRIPTION OF THE EMBODIMENTS

Embodiments of the invention will be described in detail below with reference to the drawings. It should be noted that a digital video camera according to each embodiment of the present invention uses an optical disk, a flash memory card, or the like, as a recording medium.

First Embodiment

Figure 1:
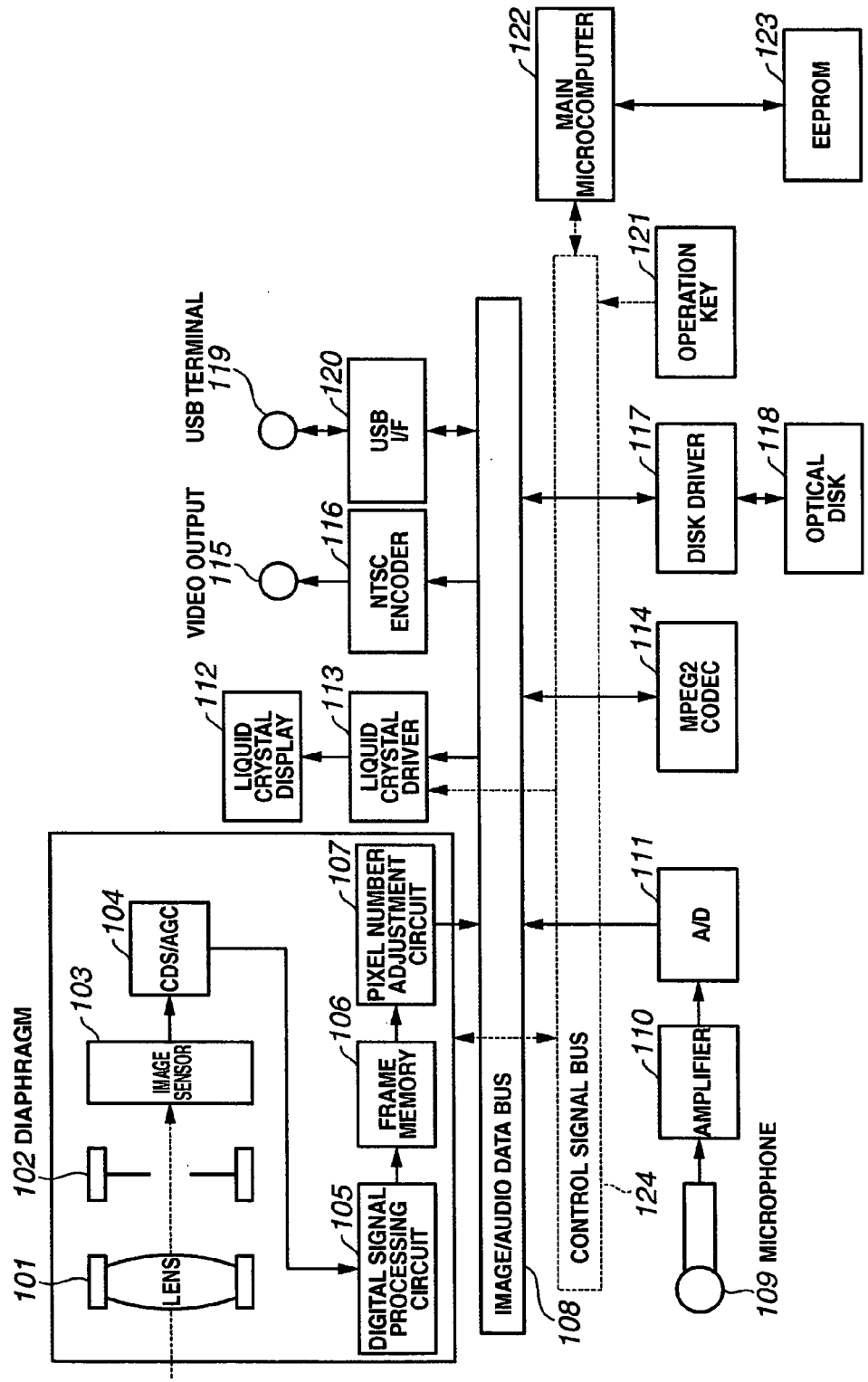
FIG. 1 is a block diagram of a video camera according to a first embodiment of the present invention.

FIG. 1 is a block diagram showing a configuration of a digital video camera according to a first embodiment of the present invention.

In FIG. 1, reference numeral 101 denotes a photographic lens for obtaining light from an object to form an image, reference numeral 102 denotes a diaphragm for controlling the amount of incident light into an image sensor 103, reference numeral 103 denotes the image sensor for converting a formed object image into an image signal, and reference numeral 104 denotes a CDS/AGC (correlated double sampling/automatic gain control) circuit for performing the sample-and-hold of the image signal to reach a suitable signal level.

Reference numeral 105 denotes a digital signal processing circuit for A/D-converting the image signal from the CDS/AGC circuit 104 to perform digital signal processing, and reference numeral 106 denotes a frame memory for accumulating moving image data outputted from the digital signal processing circuit 105 by each one frame component.

Reference numeral 107 denotes a pixel number adjustment circuit for changing image data from the frame memory 106 to a suitable pixel number in accordance with the MPEG-2 or MPEG-4 system (to be described later).

Reference numeral 108 denotes an image/audio data bus through which image data and audio data (to be described later) are transferred between individual blocks, and reference numeral 109 denotes a microphone for collecting sound to be recorded on a removable disk (to be described later) together with the image data, and reference numeral 110 denotes an amplifier for amplifying an audio signal from the microphone 109 to an appropriate level.

Reference numeral 111 denotes an A/D converter for A/D-converting the audio signal amplified by the amplifier 110, reference numeral 112 denotes a liquid crystal display for displaying reproduced image data from an MPEG2 codec 114 during the reproduction mode and for displaying an image captured by the image sensor 103 during photographing, and reference numeral 113 denotes a liquid crystal driver for driving the liquid crystal display 112.

Reference numeral 114 denotes the MPEG2 codec for compressing and encoding a moving image signal from the image/audio data bus 108 using the MPEG-2 system during recording, and also for decoding and expanding reproduced MPEG-2 data during reproduction.

Reference numeral 115 denotes a video output terminal for outputting an analog image signal from an NTSC encoder 116 (to be described later), reference numeral 116 denotes the NTSC encoder for converting the same image as the image displayed by the liquid crystal display 112 into an analog form and for outputting the analog video signal to the video output terminal 115.

Reference numeral 117 denotes a disk driver for performing the reading and writing of data to an optical disk 118, and reference numeral 118 denotes the optical disk for recording the image data from the image/audio data bus 108.

Reference numeral 119 denotes a USB terminal for outputting data from a USB interface 120, and reference numeral 120 denotes the USB interface for outputting the image data in the MPEG-2 system, which are recorded on the optical disk 118, to the outside thereof.

Reference numeral 121 denotes an operation key by which a user performs operation to a main body of the digital video camera, reference numeral 122 denotes a main microcomputer for controlling the mode of the digital video camera and for controlling the detection of the operation key 121 to perform various kinds of functions, reference numeral 123 denotes an EEPROM (electrically erasable programmable read-only memory), which is a nonvolatile memory for storing a predetermined state of the main microcomputer 122, and reference numeral 124 denotes a control signal bus through which control signals from the main microcomputer 122 and signals from the operation key 121 are transferred.

Figure 2:
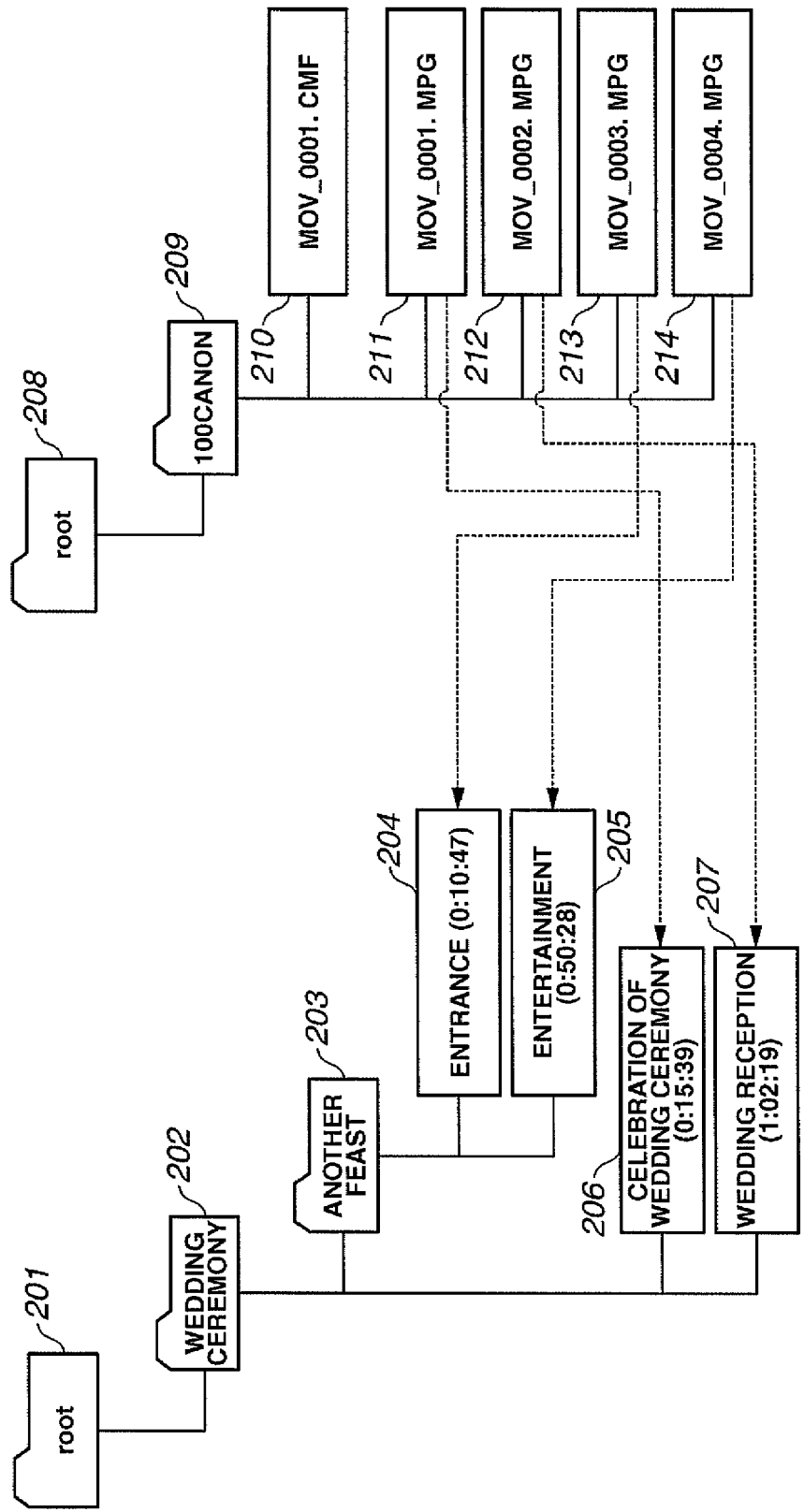
FIG. 2 is a diagram showing an example of a data configuration recorded on a recording medium according to the first embodiment of the present invention.

FIG. 2 is a diagram showing a configuration of data recorded on the disk 118 according to the first embodiment of the present invention.

FIG. 2 shows a virtual management structure managed by a content management file (CMF) 210 for managing each content file recorded on the disk 118.

In the first embodiment of the present invention, content data can hierarchically be managed by the content management file 210.

In FIG. 2, a root folder 201 is a folder for indicating an entire recording area of the disk 118. Then, under the root folder 201, a wedding ceremony folder 202 is created. Further, under the wedding ceremony folder 202, another feast folder 203, a celebration of wedding ceremony file 206 and a wedding reception file 207 are stored. Furthermore, under another feast folder 203, an entrance file 204 and an entertainment file 205 are stored.

As described above, in FIG. 2, individual contents are hierarchically handled. However, on a file system, each content file is recorded as shown in FIG. 2.

It should be noted that in the first embodiment of the present invention, the file system is a structure for managing various kinds of content files recorded on a disk and is a specific management method. In the first embodiment of the present invention, the file system is achieved by a control operation executed by the main microcomputer 122.

That is, according to the file system, a content file recorded on the disk 118 is managed by the configuration shown in FIG. 2. In FIG. 2, reference numeral 208 denotes a root folder which indicates the entire recording area of the disk 118. Under the root folder 208, a folder 209 is stored, and under the folder 209, the content management file 210 and moving image files 211 to 214 are stored.

In the first embodiment of the present invention, a file structure shown in FIG. 2 is not viewable by the user. A virtual folder is specified by the first content management file 210, and only virtually managed content files shown in FIG. 2 are viewable by the user. It should be noted that there are no occasions where the root folder 201 is viewable as a folder.

FIG. 3 is a diagram showing the details of the content management file 210 recorded on the disk 118.

In FIG. 3, reference numeral 301 indicates information on the wedding ceremony folder 202 shown in FIG. 2, in which the attribute is a folder, the name of the title is "wedding ceremony", the folder includes three items therein, and the parent folder is a root folder.

Further, reference numeral 302 indicates information on the celebration of wedding ceremony moving image file 206 shown in FIG. 2, in which the attribute is a moving image file, the name of the title is "celebration of wedding ceremony", the parent folder is the wedding ceremony folder in item 1, the entity on the file system is a "mov_0001.mpg" file 211, and recording time is 15 minutes and 39 seconds. Subsequent to the information 302, information 303 to 306 on four items is similarly recorded. Thus, a folder structure shown in FIG. 2 is achieved.

FIG. 4 is a diagram showing a display screen indicating a list of contents recorded on the disk 118 on which each content file is recorded as described above in the video camera in the first embodiment of the present invention.

In the first embodiment of the present invention, when the disk 118 is loaded or in response to power-on, the content management file 210 recorded on the disk 118 is read into and stored in a RAM contained in the main microcomputer 122.

In FIG. 4, reference numerals 403 to 406 denote moving image files. While viewing this list screen, the user can operate a cross key or the like mounted on the main body to select a desirable file.

FIG. 4 illustrates a condition where an "entrance" file 403 is selected. In this condition, if a reproduction key mounted on the main body is depressed, then the main microcomputer 122 reproduces a moving image file mov_0003.mpg 213 corresponding to the selected entrance file 403 from the disk 118 based on the content management file 210 and the file system.

Here, in the first embodiment of the present invention, image data is not recorded on the disk 118 in compliance with the DVD-Video standards.

On the other hand, in most cases, a DVD player, which is in widespread public use, can reproduce only the contents in compliance with the DVD-Video standards. For this reason, image data recorded on the disk 118 cannot be reproduced by DVD-Video players which have been in widespread public use.

Hence, to enable reproduction by these DVD players, it is required to convert the contents into the DVD-Video standards and to copy these contents to a recording medium such as a DVD-R.

However, in the DVD-Video standards, the title cannot hierarchically be managed in the manner shown in FIG. 2. Thus, there are cases where the content file recorded on the disk 118 cannot be copied to the DVD-R while maintaining a management structure by the content management file 210.

That is, to secure compatibility with the DVD-R, the management structure is required to change so as to perform management in a state in which contents in a folder are extracted to the outside of the folder.

Therefore, in the first embodiment of the present invention, a second content management file is created which provides a management structure allowing direct copying to the DVD-R. The operation and action associated with the second content management file will be described bellow.

In the digital video camera in the first embodiment of the present invention, a DVD-R compatible button is mounted, and when the DVD-R compatible button is depressed, the second content management file (containing information 501 and 502) is created as illustrated in FIG. 5.

It should be noted that the second content management file is created separately from the first content management file 210. In addition, while the first content management file 210 indicates all original contents recorded on the disk 118, the second content management file indicates optional original contents without affecting the folder configuration or the like of the original contents. Additionally, a plurality of second content management files may be created.

Further, in the first embodiment of the present invention, the first content management file is handled as "original", whereas the second content management file is handled as "playlist". Furthermore, in the following, "title" indicates one program, and "chapter" indicates one of a plurality of parts obtained by dividing one title. During reproduction, a cue position can be detected in units of the chapter.

In the digital video camera in the first embodiment of the present invention, the management structure corresponding to the first content management file is changed according to the following procedure, and the second content management file, which indicates a changed management structure, is created.

First, a plurality of contents present in one folder are combined into one title in the DVD-Video standards, and a boundary between the combined contents is set as a chapter in the DVD-Video standards. Also, a folder present in the folder is set as one independent title, and each of the contents stored in the title is combined with another content as a chapter.

Figure 6:
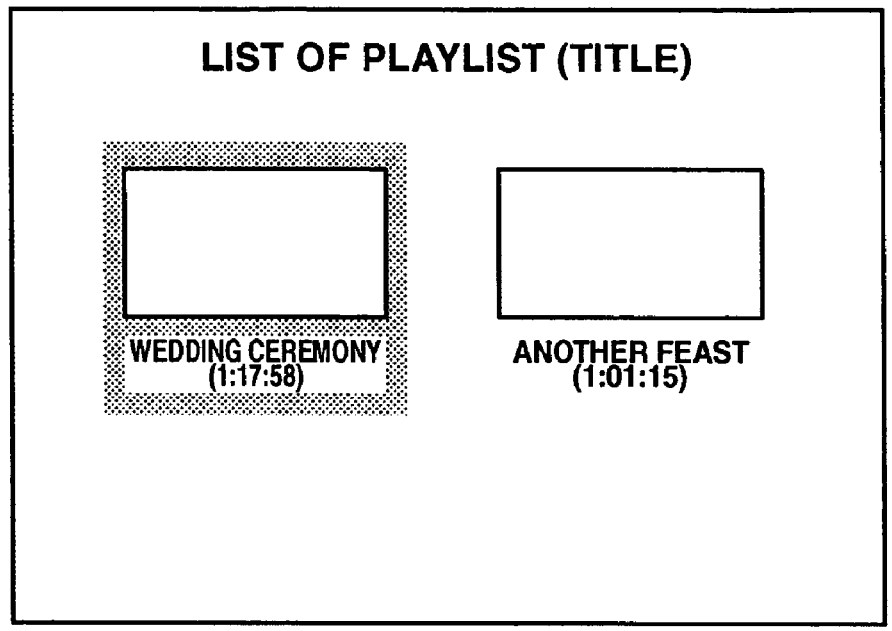
FIG. 6 is a diagram showing an example of a list of playlist titles according to the first embodiment of the present invention.
Figure 7:
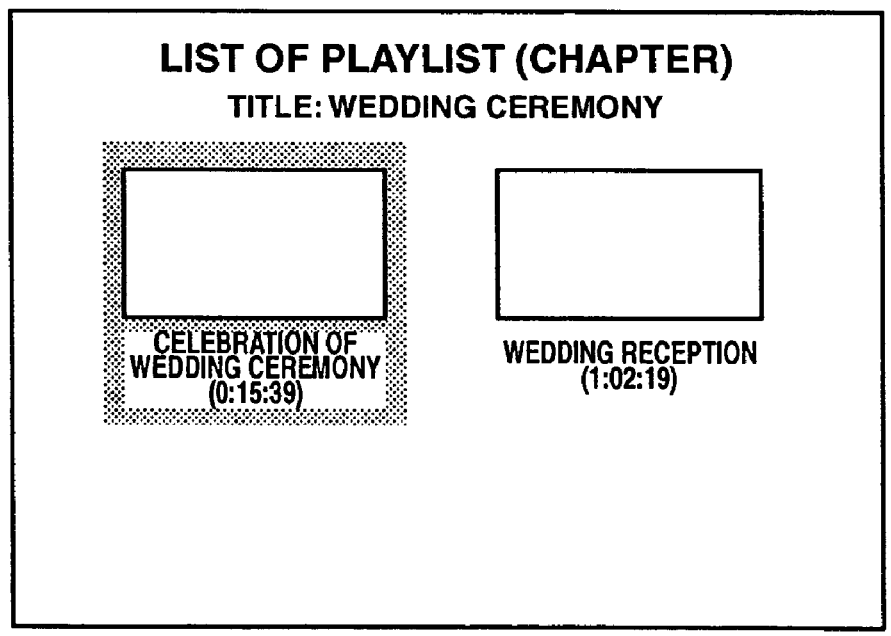
FIG. 7 is a diagram showing an example of a list of playlist chapters according to the first embodiment of the present invention.
Figure 8:
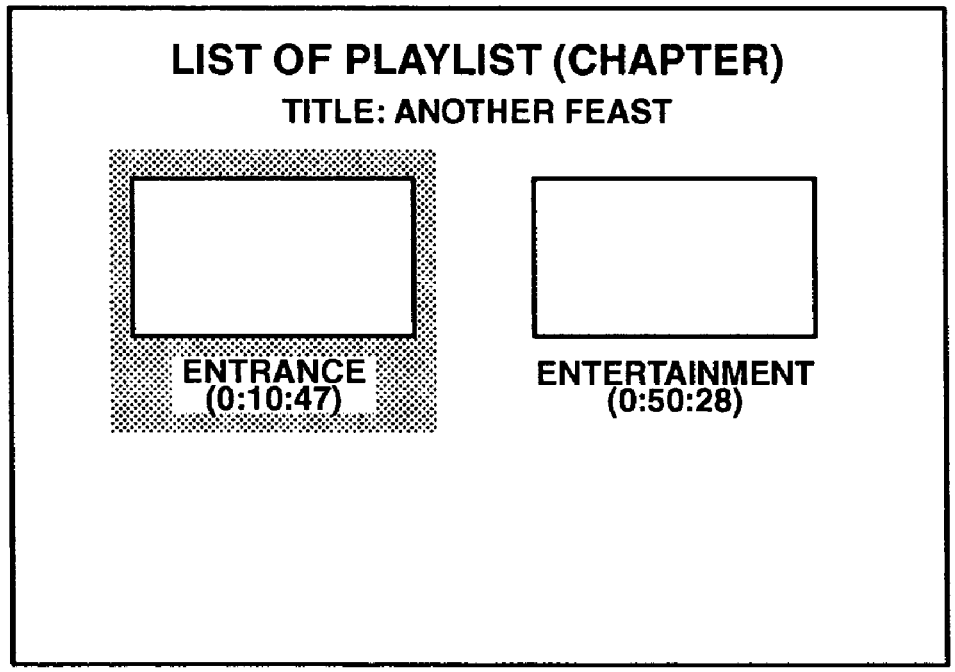
FIG. 8 is a diagram showing an example of a list of playlist chapters according to the first embodiment of the present invention.

FIGS. 6 to 8 are diagrams showing the state of a screen displaying a representative image of each title and chapter in a list corresponding to the contents of the second content management file shown in FIG. 5 in the digital video camera shown in FIG. 1.

In FIG. 6, a "wedding ceremony" title and "another feast" title are displayed. In the "wedding ceremony" title, the "celebration of wedding ceremony" content and the "wedding reception" content in the "wedding ceremony" folder managed by the first content management file are combined, and the name "wedding ceremony" used as a folder name is used as a title name. In the "another feast" title, the "entrance" content and the "entertainment" content in the "another feast" folder are combined, and the name "another feast" used as a folder name is used as a title name.

FIG. 7 is a diagram showing an example in which the "wedding ceremony" title is selected and the contents of the "wedding ceremony" title is displayed. In FIG. 7, the "celebration of wedding ceremony" content and the "wedding reception" content stored in the "wedding ceremony" folder managed by the first content management file are combined, and each of them is managed as a chapter in the "wedding ceremony" title.

Also, FIG. 8 is a diagram showing an example in which the "another feast" title is selected and the contents of the "another feast" title is displayed. In FIG. 8, the "entrance" content and the "entertainment" content stored in the "another feast" folder managed by the first content management file are combined, and each of them is managed as a chapter in the "another feast" title.

As described above, in the first embodiment of the present invention, each content file recorded on the disk 118 can be reproduced according to a configuration managed by the second content management file.

In a case where the second content management file is created, the user can optionally select and use either the management structure of the first content management file or the management structure of the second content management file so as to reproduce image data recorded on the disk 118.

Furthermore, a DVD writer having a USB interface can be connected to the USB terminal 119, and according to the management structure indicated by the second content management file, a content file recorded on the disk 118 can be written into a DVD-R. Furthermore, a content list screen shown in FIG. 4 may be configured to be directly written into the DVD-R as a menu screen.

Moreover, in a case where the original content contains still images, an MPEG file having the contents in which the still images are sequentially turned over at intervals of a predetermined time may be created, and the MPEG file may be handled in the same manner as the other original content containing moving images. In this case, a folder into which only the still images are grouped may be created.

Second Embodiment

A second embodiment of the present invention will be described below.

A block diagram of the digital video camera in the second embodiment of the present invention is similar to FIG. 1 showing the first embodiment of the present invention.

Figure 9:
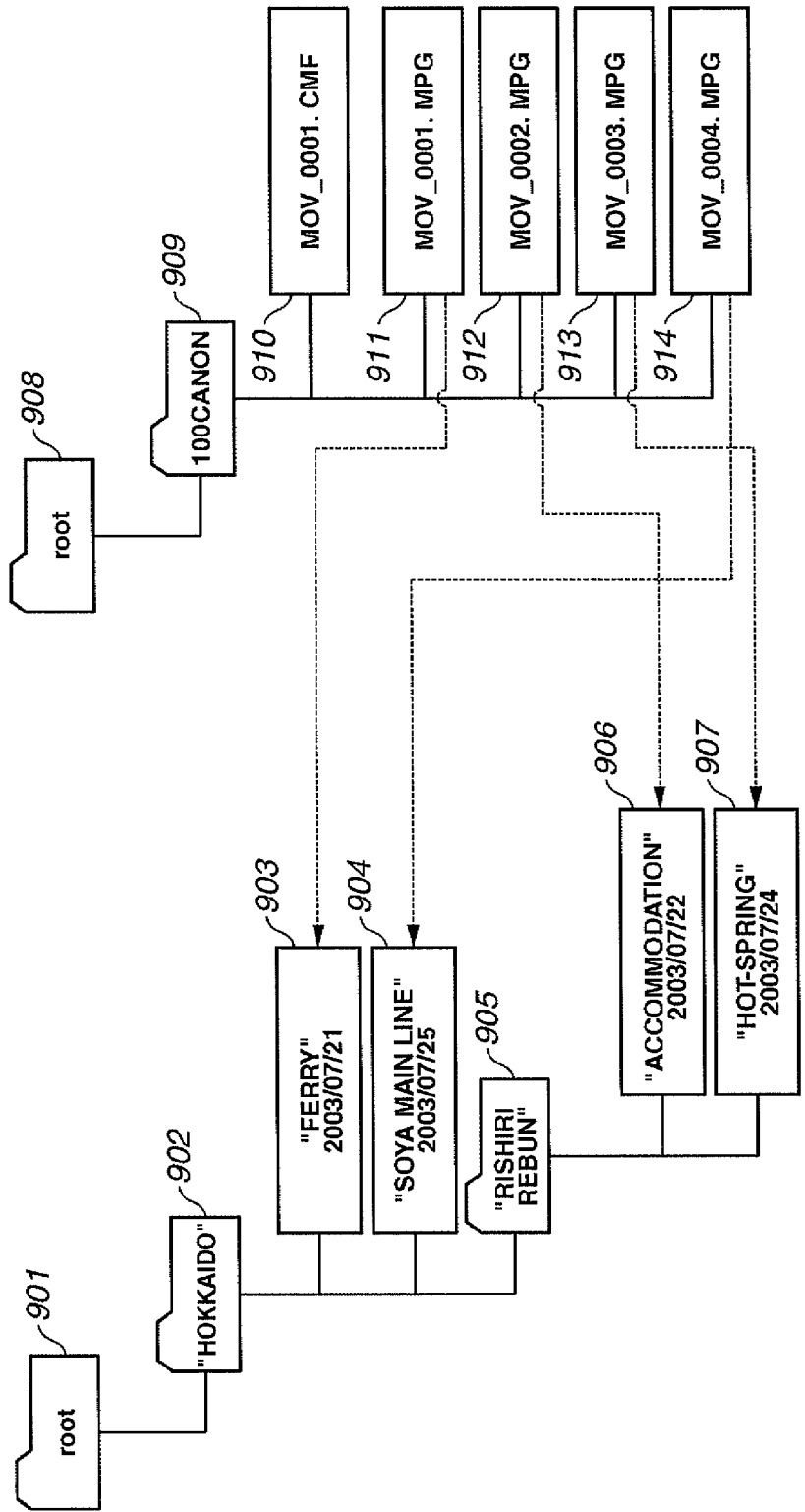
FIG. 9 is a diagram showing an example of a data configuration recorded on a recording medium according to a second embodiment of the present invention.

FIG. 9 is a diagram showing a configuration of data recorded on the disk 118 in the second embodiment of the present invention.

FIG. 9 shows a virtual management structure managed by a content management file (CMF) 910 for managing each content file recorded on the disk 118.

In FIG. 9, a root folder 901 is a folder for indicating an entire recording area of the disk 118. Then, under the root folder 901, a Hokkaido folder 902 is created. Further, under the Hokkaido folder 902, a Rishiri Rebun folder 905, a ferry file 903, and a Soya Main Line file 904 are stored. Also, under the Rishiri Rebun folder 905, an accommodation file 906 and a hot-spring file 907 are stored.

On the other hand, according to a file system, content files recorded on the disk 118 are managed by a configuration shown in FIG. 9. In FIG. 9, reference numeral 908 denotes a root folder, which indicates the entire recording area of the disk 118. Under the root folder 908, a folder 909 is stored. Under the folder 909, the content management file (CMF) 910 and moving image files 911 to 914 are stored.

FIG. 10 is a diagram showing the details of the content management file 910.

In FIG. 10, reference numeral 1001 indicates information on the Hokkaido folder 902 shown in FIG. 9, in which the attribute is a folder, the name of the title is "Hokkaido", the folder contains three items therein, and the parent folder is a root folder. Also, reference numeral 1002 indicates information on the ferry moving image file 903 shown in FIG. 9, in which the attribute is a moving image file, the name of the title is "ferry", the parent folder is the "Hokkaido" folder 902 in item 1, the entity on the file system is a "mov_0001.mpg" file 911, and recording date is Jul. 21, 2003. Subsequent to the information 1002, information 1003 to 1006 on four items is similarly recorded. Thus, a folder structure shown in FIG. 9 is achieved.

Figures 11, 12:
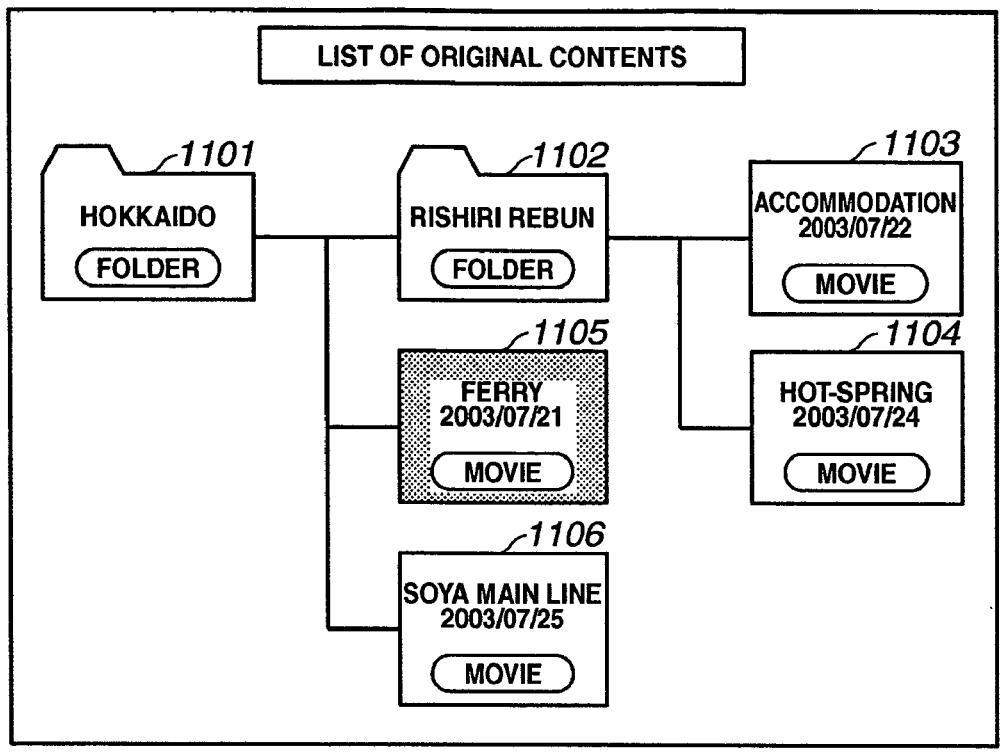
FIG. 11 is a diagram showing an example of a list of original contents according to the second embodiment of the present invention.
FIG. 12 is a diagram showing an example of a fourth content management file according to the second embodiment of the present invention.

FIG. 11 is a diagram showing a display screen indicating a list of contents recorded on the disk 118 on which each content file is recorded as described above in the video camera in the second embodiment of the present invention.

In the second embodiment of the present invention, when the disk 118 is loaded or in response to power-on, the content management file 910 recorded on the disk 118 is read into and stored in a RAM contained in the main microcomputer 122.

In FIG. 11, reference numerals 1103 to 1106 denote moving image files. While viewing this list screen, the user can operate a cross key or the like mounted on the main body to select a desirable file.

FIG. 11 illustrates a condition in which a "ferry" content 1105 is selected. In this condition, if a reproduction key mounted on the main body is depressed, then the main microcomputer 122 reproduces a selected image file mov_0001.mpg based on the content management file 910 and the file system.

In the second embodiment of the present invention, image data are not recorded on the disk 118 in compliance with the DVD-Video standards.

On the other hand, in most cases, a DVD player, which has been spread among the public use, can reproduce only the contents in compliance with the DVD-Video standards. For this reason, image data recorded on the disk 118 cannot be reproduced by DVD players which have been spread among the public use.

Hence, to enable reproduction by these DVD players, it is required to convert the contents into the DVD-Video standards and to copy these contents to a recording medium such as a DVD-R.

However, in the DVD-Video standards, the folder cannot hierarchically be managed in the manner shown in FIG. 9. Thus, there are cases where the content file recorded on the disk 118 cannot be copied to the DVD-R while maintaining a management configuration by the content management file 910.

That is, to secure compatibility with the DVD-R, a management structure is required to change so as to perform management in a state in which contents in a folder are extracted to the outside of the folder.

Therefore, in the second embodiment of the present invention, a fourth content management file is created which provides a management structure allowing direct copying to the DVD-R. The operation and action associated with the second embodiment will be described bellow.

In the digital video camera in the second embodiment of the present invention, a DVD-R compatible button is mounted, and when the DVD-R compatible button is depressed, the fourth content management file (containing information 1201) is created as illustrated in FIG. 12.

It should be noted that the fourth content management file is created separately from the third content management file 910.

Further, while the third content management file 910 indicates all original contents recorded on the disk 118., the fourth content management file indicates optional original contents without affecting the folder configuration or the like of the original contents. Additionally, a plurality of fourth content management files may be created.

Also, in the second embodiment of the present invention, the third content management file is handled as "original", whereas the fourth content management file is handled as "playlist". In addition, in the following, "title" indicates one program, and "chapter" indicates one of a plurality of parts obtained by dividing one title. During reproduction, a cue position can be detected in units of the chapter.

Then, in the digital video camera in the second embodiment of the present invention, in order to create the fourth content management file, all contents are combined into one title regardless of folders managed by the third content management file, and a boundary between the combined contents is set as a chapter.

Then, the fourth content management file, which indicates the management structure changed as described above, is created.

The fourth content management file created as described above is stored in the EEPROM 123 or is recorded on the disk 118. In this case, for example, the fourth content management file is stored under the folder 909 shown in FIG. 9.

Figure 13:
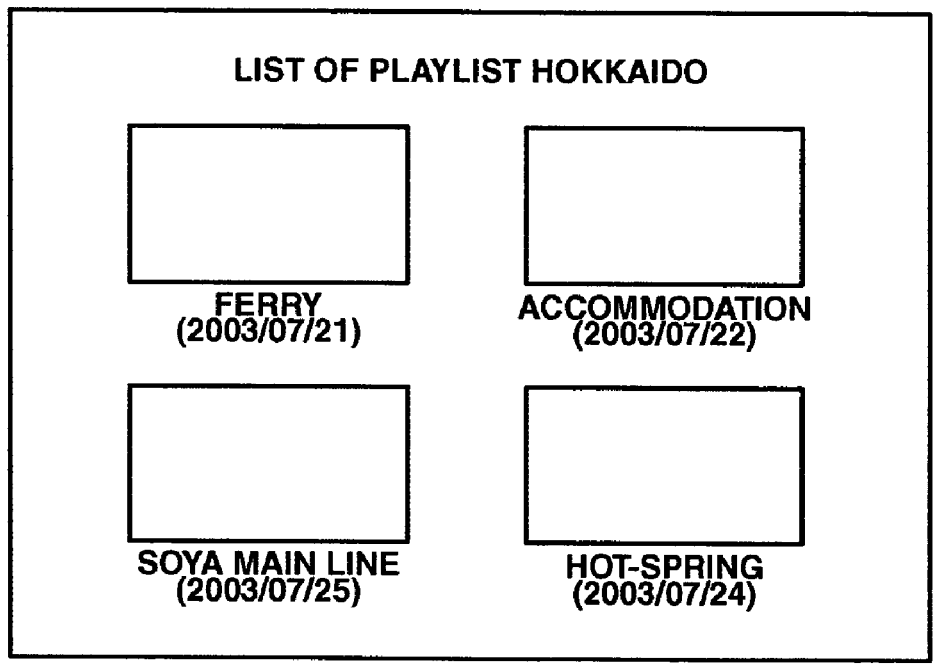
FIG. 13 is a diagram showing an example of a list of playlist chapters according to the second embodiment of the present invention.

In a case where a list of contents is displayed according to the fourth content management file shown in FIG. 12, a representative image of each content file is displayed in the list as shown in FIG. 13.

Also, when after the fourth content management file is created, the user instructs the digital video camera to perform reproduction according to the fourth content management file, designated image files are reproduced in the order of chapters written in the fourth content management file.

As described above, the digital video camera in the second embodiment of the present invention can reproduce each content file recorded on the disk 118 according to the configuration managed by the fourth content management file.

In a case where the fourth content management file is created, the user can optionally select and use either the management structure of the third content management file or the management structure of the fourth content management file so as to reproduce image data recorded on the disk 118.

Also, a DVD writer having a USB interface can be connected to the USB terminal 119, and according to the management structure indicated by the fourth content management file, a content file recorded on the disk 118 can be written into a DVD-R. It should be noted that in the DVD-R prepared here, there is no content menu or the like, and only image contents are recorded.

Further, in the second embodiment of the present invention, the contents are combined in the order of photographing date. However, other methods may be configured to combine the contents in the order of name or in the order of photographing date or name in each hierarchical layer of each folder.

Furthermore, in a case where the original content contains still images, an MPEG file having the contents in which the still images are sequentially turned over at intervals of a predetermined time may be created, and the MPEG file may be handled in the same manner as the other original content containing moving images. In this case, the MPEG file containing still images may be added to the end of the other series of moving image contents.

Moreover, while in the above-described first and second embodiments of the present invention, an apparatus for managing image data recorded on a disk-shaped recording medium is disclosed, the present invention can also similarly be applied to an apparatus for managing content data other than image data.

Other Embodiments

Further, each embodiment of the present invention can also be achieved by the steps in which a storage medium (or recording medium) storing program code of software for implementing the above-described function of the embodiment of the present invention is supplied to a system or an apparatus, and a computer (CPU or MPU) of the system or the apparatus reads and executes the program code stored on the storage medium. In this case, the program code itself read from the storage medium achieves the above-described function of the embodiment of the present invention, and, therefore, the storage medium on which the program code is stored constitutes the present invention. Furthermore, when the program code read by the computer is executed, the above-described function of the embodiment of the present invention is implemented. In addition, on the basis of commands of the program code, an operating system (OS) or the like running on the computer executes a part or the whole of practical processing, and by this processing, the above-described function of the embodiment of the present invention is also implemented.

Moreover, the program code read from the storage medium can be written in a memory contained in a function expansion card inserted into the computer or a function expansion unit connected to the computer. Then, on the basis of commands of the program code, a CPU or the like contained in the function expansion card or the function expansion unit executes a part or the whole of practical processing, and by this processing, the above-described function of the embodiment of the present invention is also implemented.

In a case where the present invention is applied to the storage medium, program code corresponding to the above-described procedure is stored in the storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2004-255771 filed Sep. 2, 2004, which is hereby incorporated by reference herein in its entirety.

What is claimed is:

1. An image processing apparatus comprising:

a processor;

a managing unit that manages a moving image file recorded on a recording medium in accordance with a predetermined file system, each of a plurality of moving image file recorded on the recording medium having respective file name corresponding to the predetermined file system;

a creating unit that creates, based on a first management file, a second management file different from the first management file, the first management file managing the moving image file recorded on the recording medium as a virtual moving image file and a virtual folder storing the virtual moving image file in accordance with a different format from a predetermined recording format in which a plurality of moving image files are managed by a single layer;

both the first management file and the second management file being different from the moving image file recorded on the first recording medium, the first management file including information of virtual file names of a plurality of first virtual moving image file different from the file name corresponding to the predetermined file system, wherein the creating unit creates the second management file, based on the first management file, such that a first combined moving image file which is generated by combining the plurality of first virtual moving image files stored in a first virtual folder and has a plurality of first chapters corresponding to the plurality of first virtual moving image files and a second combined moving image file which is generated by combining a plurality of second virtual moving image files stored in a second virtual folder and has a plurality of second chapters corresponding to the plurality of second virtual moving image files are managed by a single layer;

wherein the creating unit determines the virtual file names of the plurality of first virtual moving image files corresponding to the plurality of first chapters as chapter names of the plurality of first chapters, and determines the virtual file names of the plurality of second virtual moving image files corresponding to the plurality of second chapters as chapter names of the plurality of second chapters;

wherein the second management file includes information of the chapter names of the plurality of first chapters and information of the chapter names of the plurality of second chapters;

a display unit that displays a first screen showing a first virtual file names of the plurality of first virtual moving image files stored in the first virtual folder and a second virtual file names of the plurality of second virtual moving image files stored in the second virtual folder in accordance with the first management file, wherein the display unit displays a second screen showing the chapter names of the plurality of first chapters and a third screen showing the chapter names of the plurality of second chapters in accordance with the second management file.

2. The image processing apparatus according to claim, 1 wherein the creating unit creates the second management file such that the first combined moving image file is reproduced in the order of recording of the first moving image file and the second combined moving image file is reproduced in the order of recording of the second moving image file.

3. The image processing apparatus according to claim 1, wherein the predetermined recording format includes DVD-Video (digital versatile disc-Video) format,
   the second management file managing each of the first combined moving image file and the second combined moving image file as one title in DVD-Video format.

* * * * *